(12) United States Patent
Taneichi

(10) Patent No.: US 7,744,322 B2
(45) Date of Patent: Jun. 29, 2010

(54) NUT

(76) Inventor: Kaoru Taneichi, 463-11 Aiko, Atugi City, Kanagawa (JP) 243-0035

( * ) Notice: Subject to any disclaimer, the term of this patent is extended or adjusted under 35 U.S.C. 154(b) by 110 days.

(21) Appl. No.: 11/992,908

(22) PCT Filed: Sep. 29, 2005

(86) PCT No.: PCT/JP2005/017975

§ 371 (c)(1),
(2), (4) Date: Mar. 31, 2008

(87) PCT Pub. No.: WO2007/037009

PCT Pub. Date: Apr. 5, 2007

(65) Prior Publication Data

US 2009/0226281 A1    Sep. 10, 2009

(51) Int. Cl.
*F16B 37/08* (2006.01)
(52) U.S. Cl. ............... 411/433; 411/267; 411/533
(58) Field of Classification Search ............ 411/267, 411/432, 433, 12, 533
See application file for complete search history.

(56) References Cited

U.S. PATENT DOCUMENTS 5,613,816 A * 3/1997 Cabahug ............ 411/433
5,733,084 A * 3/1998 Fullerton ............ 411/267
5,800,108 A * 9/1998 Cabahug ............ 411/433
6,007,284 A * 12/1999 Taneichi ............ 411/267

FOREIGN PATENT DOCUMENTS

| JP | 15-1899 | 2/1940 |
|---|---|---|
| JP | 2001-221220 | 8/2001 |
| JP | 2001-295374 | 10/2001 |
| JP | 2003-287014 | 10/2003 |

* cited by examiner

*Primary Examiner*—Gary Estremsky
(74) *Attorney, Agent, or Firm*—Jordan and Hamburg LLP

(57) ABSTRACT

A nut having a nut body, a spring case, a washer, and a nut body urging spring. The nut body has received in it at least three or more nut segments and a nut segment urging spring, where the nut segments are, when rotated in the tightening direction after a bolt is inserted into the nut segments, screwed on to the thread of the bolt inserted. The spring case is attached at its upper end to the outer circumferential surface other than the upper part of the nut body so that the spring case is rotatable together with the nut body. The washer is rotatably attached to the lower part of the spring case. The urging spring is installed such that its one end received in the spring case is connected to the spring case or to the nut body and the other end to the washer, so that the urging spring can constantly urge the nut body in the tightening direction when the nut body is screwed on the bolt. When the nut is fitted on the bolt and rotated in the tightening direction, at least the three or more nut segments are screwed on to the thread of the bolt, causing the nut body in which the nut segments are received to be constantly urged in the tightening direction, which eliminates play of the nut segments to keep the nut and the bolt in a state where they are reliably screwed to each other.

3 Claims, 18 Drawing Sheets

NUT

BACKGROUND OF THE INVENTION

The present invention relates to a nut having a nut segment which, after a bolt is inserted into the nut segment, is screwed on to the threaded portion of the bolt.

A conventional nut of this kind is comprised of: a nut body having an outer wall formed in the shape of a polygon and an inner wall having an inclined hole of which diameter decreases gradually; a stopper plate having a bolt insertion hole formed at a larger diameter end of the nut body; at least three or more guideposts formed coaxially on the inner wall surface of the nut body; at least three or more nut segments being movably disposed between the guideposts so as to permit sliding movement in an axial direction, each of the nut segments having an inner surface having a screw thread for engaging a thread of the bolt; an attachment piece, which is formed in the shape of a flange, fixed at a smaller diameter end of the nut body, the attachment piece prevents the at least three or more nut segments from falling off, projects outwardly of the outer circumferential surface of the nut body; and an urging spring received in the nut body to bias the at least three or more nut segments toward the smaller diameter end of the nut body.

In the above-mentioned structure, the nut, when rotated in the tightening direction after the bolt is inserted into the nut segments, makes the three nut segments screwed on to the thread portion of the bolt. However, a drawback is that there may or may not always be a clearance about one pitch width of a thread.

Patent document 1: Japanese published unexamined application H11-72110

SUMMARY OF THE INVENTION

In view of the conventional drawback as described above, it is an object of the present invention to provide a nut which, when it is fitted on the bolt and rotated in the tightening direction, at least the three or more nut segments are screwed on to the thread of the bolt, causing the nut body in which the nut segments are received to be constantly urged in the tightening direction, which eliminates play of the nut segments to keep the nut and the bolt in a state where they are reliably screwed to each other.

The above and further objects and novel features of the present invention will more fully appear from the following detailed description when the same is read in connection with the accompanying drawings.

It is to be understood that these are for the purpose of illustration only and are not intended to be a definition of the limits of the invention.

In order to achieve the above mentioned purpose, in the present invention, the nut is comprised of: a nut body which has received in it at, least three nut segments and a nut segment urging spring which urges the nut segments, where the nut segments are, when rotated in the tightening direction after a bolt is inserted into the nut segments, screwed on to a threaded portion of the inserted bolt; a spring case which is attached at an upper end thereof to an outer circumferential surface of the nut body other than of an upper part of the nut body so that the spring case is rotatable together with the nut body; a washer which is rotatably attached to a lower part of the spring case; a nut body urging spring which is received in the spring case with one end of the spring connected to the spring case or to the nut body and another end thereof to the washer, so that the spring constantly urges the nut body in the tightening direction when the nut body is screwed on to the bolt.

According to another aspect of the invention, the nut is comprised of: a nut body which has received in it at least three nut segments and a nut segment urging spring which urges the nut segments, where the nut segments are, when rotated in the tightening direction after a bolt is inserted into the nut segments, screwed on to a threaded portion of the inserted bolt; a spring case which is rotatably attached at an upper end thereof to a lower part of an outer circumferential surface of the nut body; a washer which is attached to a lower part of the spring case; a nut body urging spring which is received in the spring case with one end of the spring connected to the nut body and another end thereof to the washer or to the spring case, so that the spring constantly urges the nut body in the tightening direction when the nut body is screwed on to the bolt.

According to yet another aspect of the invention, the nut is comprised of: a nut body which has received in it at least three nut segments and a nut segment urging spring which urges the nut segments, where the nut segments are, when rotated in the tightening direction after a bolt is inserted into the nut segments, screwed on to a threaded portion of the inserted bolt; a spring support plate which is fixedly attached to an outer circumferential surface of the nut body other than of the upper part of the nut body; a washer which is rotatably attached to a lower part of the nut body with a clearance relative to the spring plate; a nut body urging spring which is received between the washer and the spring plate with one end of the spring connected to the spring plate and another end thereof to the washer, so that the spring constantly urges the nut body in the tightening direction when the nut body is screwed on to the bolt.

As is clear from the above-mentioned explanations, the present invention as hereinabove defined provides the effects enumerated below.

When the nut is automatically fitted and screwed on the bolt in the tightening direction, at least the three or more nut segments are screwed on to the thread of the bolt, causing the screwed nut segments to constantly urge the nut body in the tightening direction. Therefore, eliminated is play of the nut segments, which is caused by the conventional trouble that there may or may not always be a clearance about one pitch width of a thread, to keep the nut and the bolt in a state where they are reliably screwed to each other.

(2) As described in the above (1), because the nut is attached to the nut body, it is easy to handle and can be used just like conventional nuts.

(3) As described in the above (1), addition of a spring case and a nut body urging spring is all that is needed, so that it can be produced easily.

DETAILED DESCRIPTION OF THE INVENTION

Figure 1:
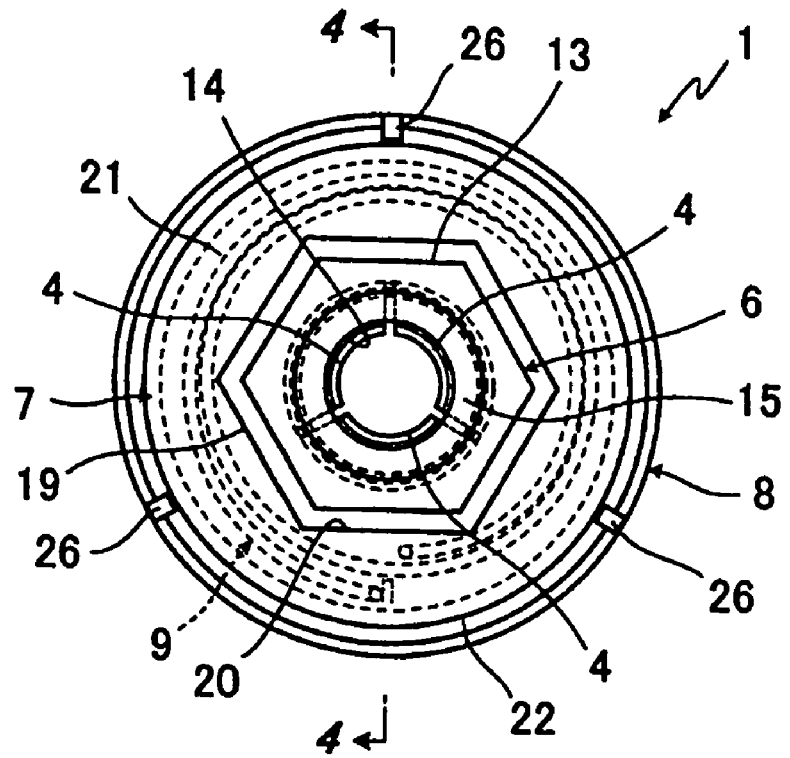
FIG. 1 is a plan view of a first preferred embodiment to practice the present invention.
Figure 2:
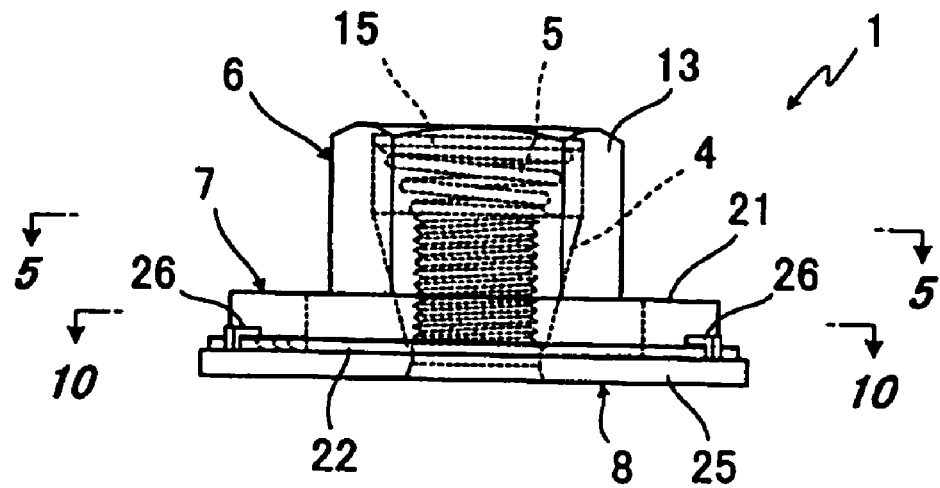
FIG. 2 is a front view of the first preferred embodiment to practice the present invention.
Figure 3:
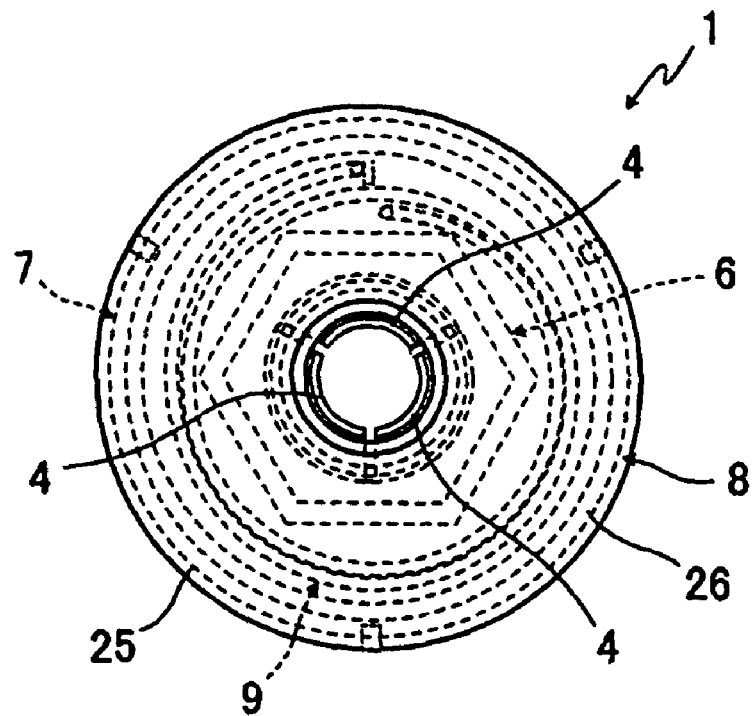
FIG. 3 is a bottom view of the first preferred embodiment to practice the present invention.
Figure 4:
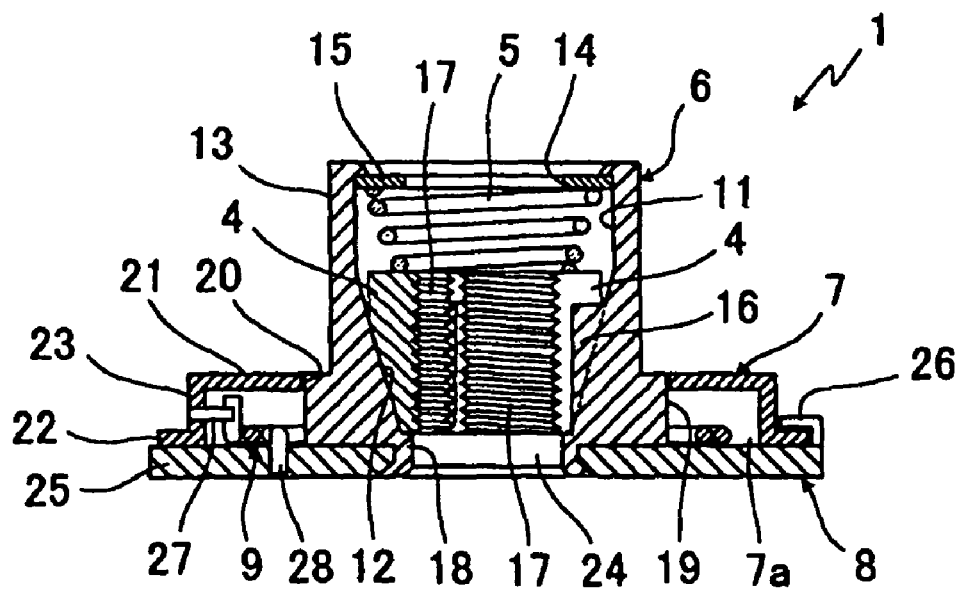
FIG. 4 is a sectional view along the line 4-4 of FIG. 1.
Figure 5:
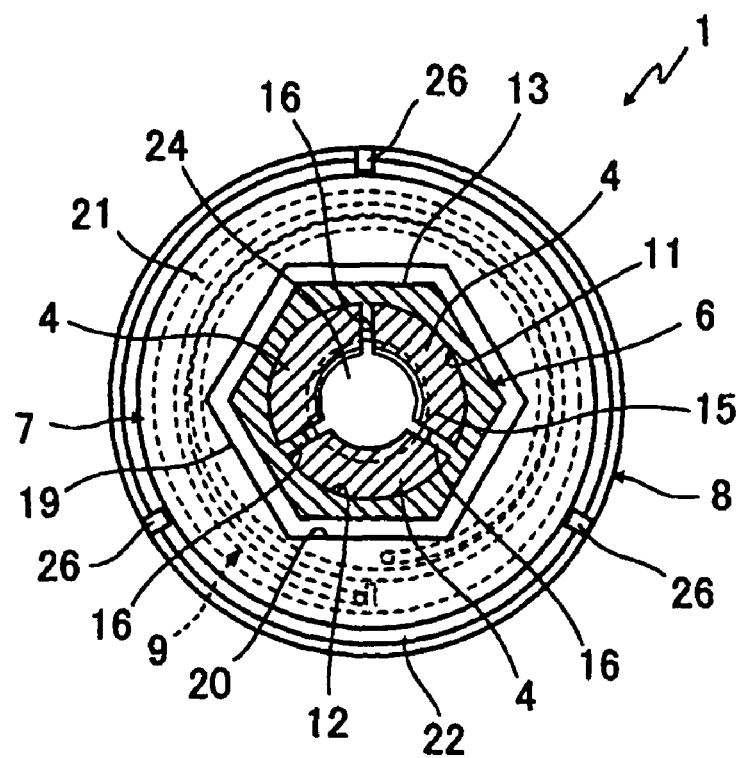
FIG. 5 is a sectional view along the line 5-5 of FIG. 2.
Figure 6:
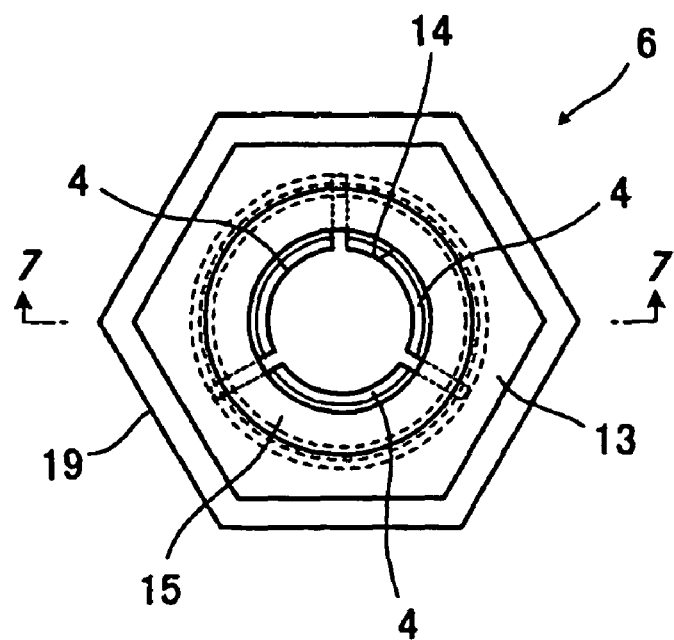
FIG. 6 is a plan view of a nut body of the first preferred embodiment to practice the present invention.
Figure 7:
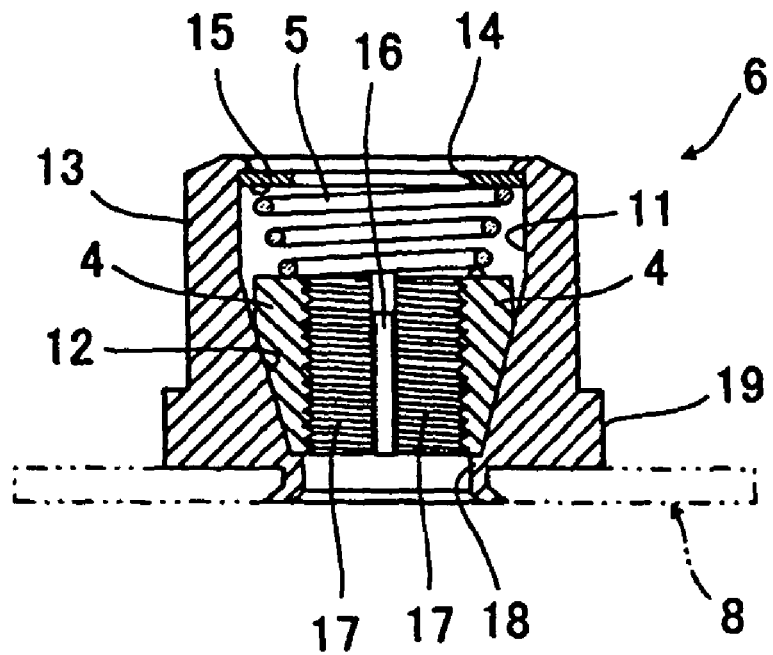
FIG. 7 is a sectional view along the line 7-7 of FIG. 6.

Preferred embodiments to practice the present invention will now be described in detail below referring to the accompanying drawings.

FIGS. 1 to 12 illustrate a first embodiment to practice the present invention wherein 1 is a nut of the present invention. The nut 1 comprises: a nut body 6 which has received in it at least three or more nut segments 4, 4,4 and a nut segment urging spring 5 which urges the nut segments 4, 4, 4, where the nut segments are, when rotated in the tightening direction after a bolt is inserted into the nut segments, screwed on to the threaded portion of the inserted bolt; a spring case 7 which is attached at its upper end of the outer circumferential surface other than the upper part of the nut body 6 so that the spring case is rotatable together with the nut body 6; a washer 8 which is rotatably attached to the lower part of the spring case 7; a nut body urging spring 9 formed in the shape of a flat spiral spring or a coil spring, which is installed such that its one end received in the spring case 7 is connected to the spring case 7 or to the nut body 6 and the other end to the washer 8, so that the urging spring can constantly urge the nut body 6 in the tightening direction when the nut body is screwed on to the bolt 2.

FIGS. 1 to 6 illustrate the nut body 6 having an outer wall 10 formed in the shape of a polygon, for example, a hexagonal shape in each embodiment of the present invention. The nut body 6 comprises: a nut case 13 having an inner wall 11 having an inclined hole 12 of which diameter decreases gradually; a stopper plate 15 having a bolt insertion hole 14 crimp fixed at a larger diameter end of the nut case 13; at least three or more, for example, three in each embodiment of the present invention, guideposts 16, 16, 16 formed coaxially on the inner wall 11 of the nut case 13; at least three or more nut segments 4, 4, 4 being movably disposed between the guideposts 16, 16, 16 so as to permit sliding movement in the axial direction, each of the nut segments 4, 4, 4 having an inner surface 11 having a screw thread 17 for engaging a thread of the bolt 2; a nut segments retainer 18, which is formed integrally at a smaller diameter end of the nut case 13; a spring case insertion portion 19 of the spring case 7, which is formed at the outer circumferential surface of a smaller diameter end of the nut case 13; and a nut segments urging spring 5 received in the nut case 13 to bias the three nut segments 4, 4, 4 toward the nut segments retainer 18 of the nut case 13.

Figure 8:
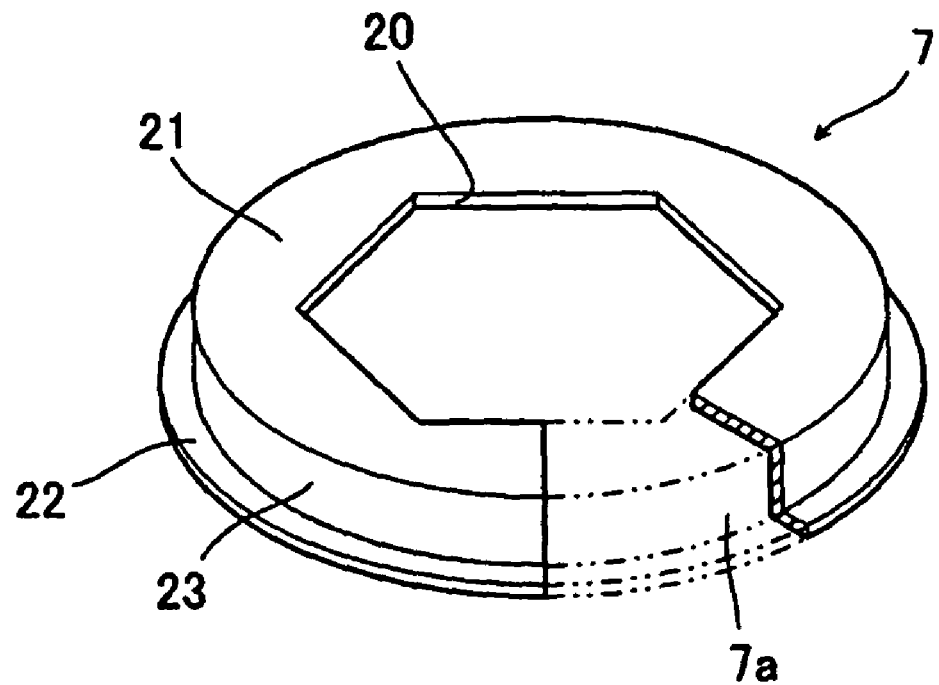
FIG. 8 is an illustration of a spring case of the first preferred embodiment to practice the present invention.

As shown in FIG. 8, the spring case 7 comprises: a top plate 21 wherein a hexagonal insertion hole 20 is formed in the upper center, through which a spring case insertion portion 19 of the nut case 13 is unrotatably inserted; and an external wall 23 having a flange 22, of which lower portion projects outwardly, formed integrally at the outer circumferential surface of the top plate 21 in such manner that it projects downwardly.

Figure 9:
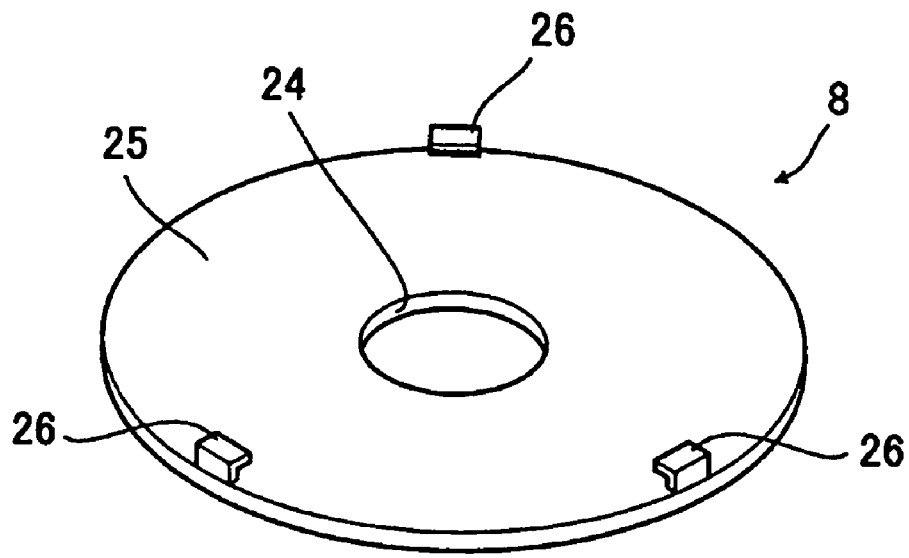
FIG. 9 is an illustration of a washer of the first preferred embodiment to practice the present invention.

As shown in FIG. 9, the washer 8 comprises: a washer body 25 which covers a lower opening 7a of the spring case 7 which a bolt insertion hole 24 is formed in the center; and a plurality of fitting pieces 26, 26, 26 formed at the outer circumferential surface of the washer body 25, which are bently formed so as to rotatably fit the washer body 25 to a flange portion 22 of the spring case 7.

Figure 10:
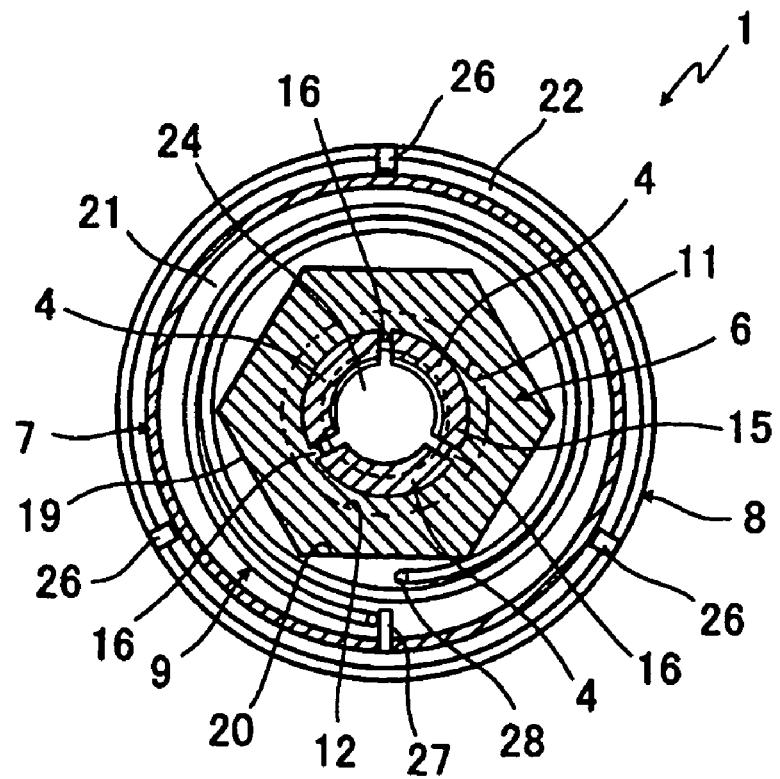
FIG. 10 is a sectional view of the line 10-10 of FIG. 2.

As shown in FIG. 10, the nut body urging spring 9 is fixed in such manner that the nut body 6 is inserted into the bolt 2 followed by rotation of the nut body 6 in the tightening direction, the nut body urging spring 9 being stopped by a stopper pin 27 of which one end is fixed to the spring case 7 so as to provide an urging force to the nut body 6 to permit it to rotate in the tightening direction; the other end of the nut body urging spring 9 which is wound about two times is fixed to a stopper pin 28 fixed to the washer 8 in a way that there is a play between the nut body urging spring 9 and an inner surface of the spring case 7.

Figure 11:
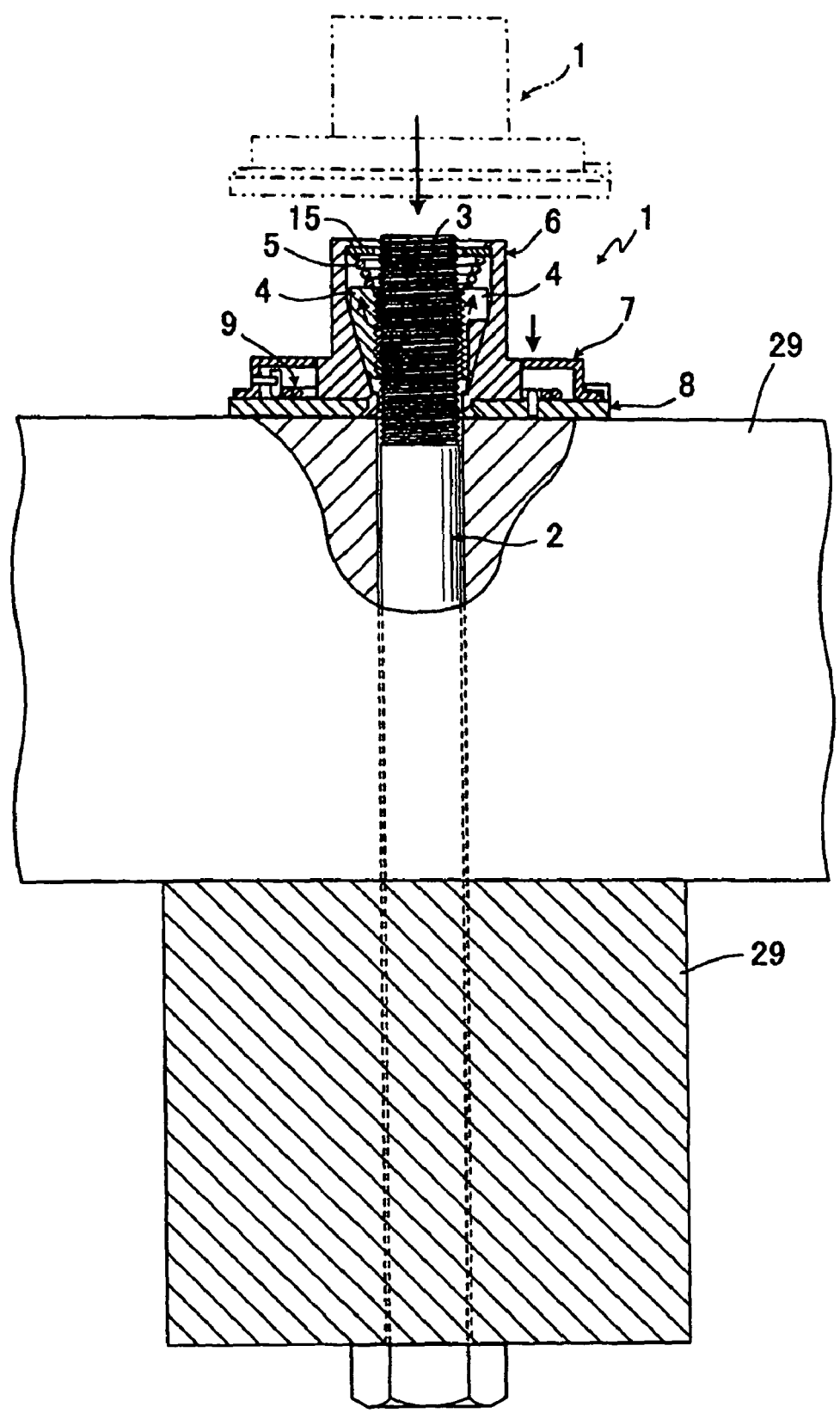
FIG. 11 is an illustration of usage state of the first preferred embodiment to practice the present invention.

As shown in FIG. 11, the nut 1 of the above structure is inserted into the bolt 2 attached to a site, where timber materials 29, 29 are fixed, to be contacted with the timber material 29. Resisting to the urging force of the nut body urging spring 5, the nut segments 4, 4, 4 will slide mode toward the larger diameter end of the inclined hole 12, allowing insertion of the bolt 2.

Figure 12:
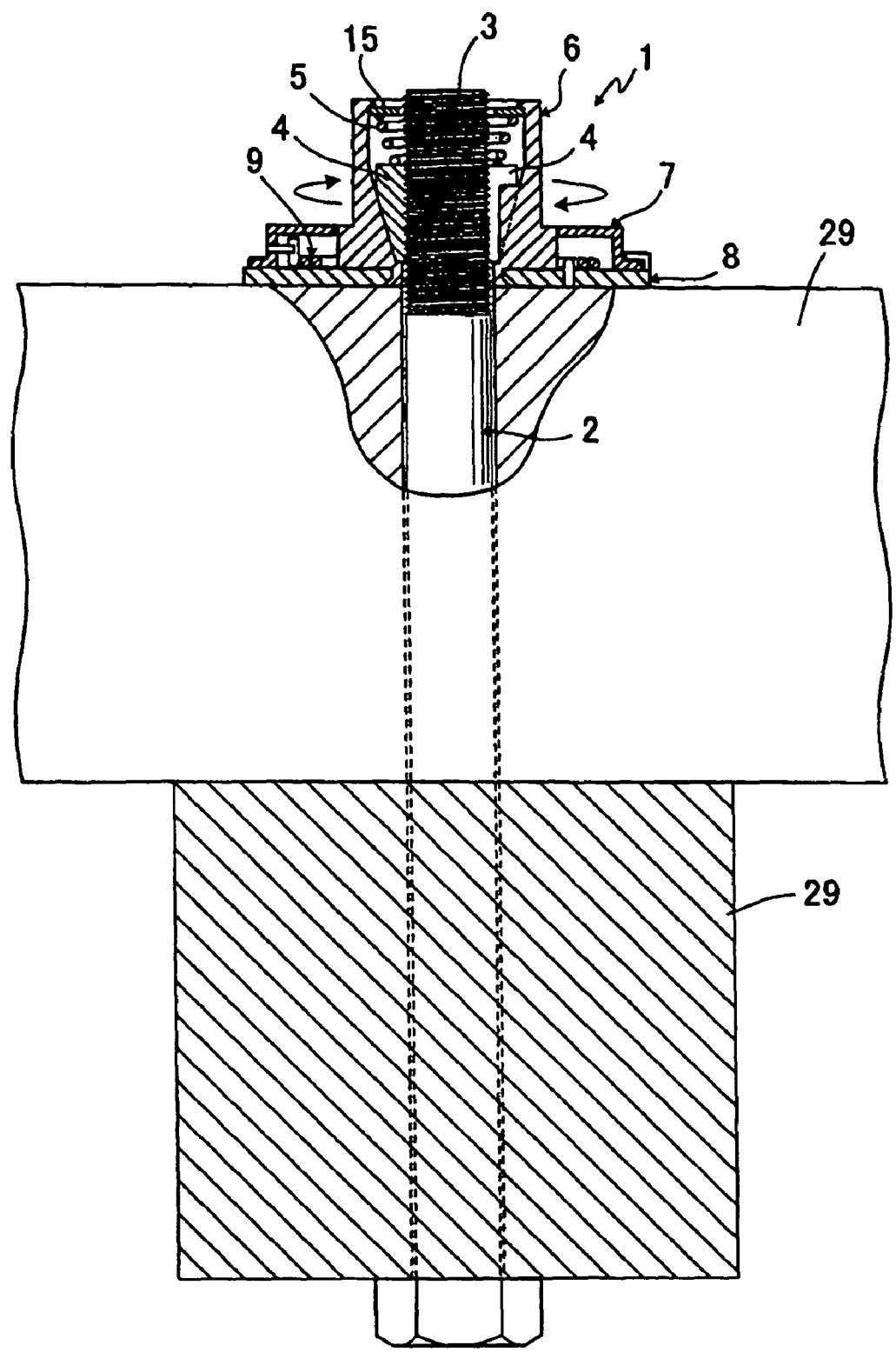
FIG. 12 is an illustration of tightening state of the first preferred embodiment to practice the present invention.

Then, by rotating the nut case 13 of the nut body 6 with a wrench or the like in the tightening direction, as in FIG. 12 a threaded portion 3 of the bolt 2 and a thread 17 of the nut segments 4, 4, 4 engage to each other, tight fix the timber materials 29, 29 while providing an urging force to the nut body urging spring 9.

Therefore, by the urging force of the nut body urging spring 9, the nut body 6 is constantly rotatably urged; a play of each of the nut segments 4, 4, 4 is eliminated; and a firm engagement condition can be retained.

Explained next are other embodiments to practice the present invention as illustrated in FIGS. 13 to 33. In explaining these other embodiments to practice the present invention, the same component parts as those in the first preferred embodiment to practice the present invention, are given the same numerals in order to avoid the overlapping explanations.

Figure 13:
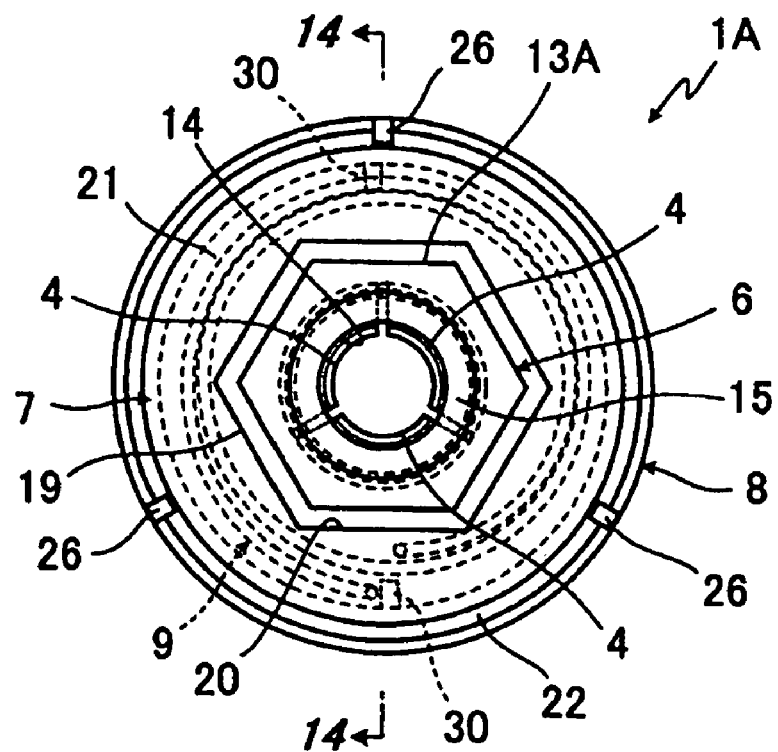
FIG. 13 is a plan view of a second embodiment to practice the present invention.
Figure 14:
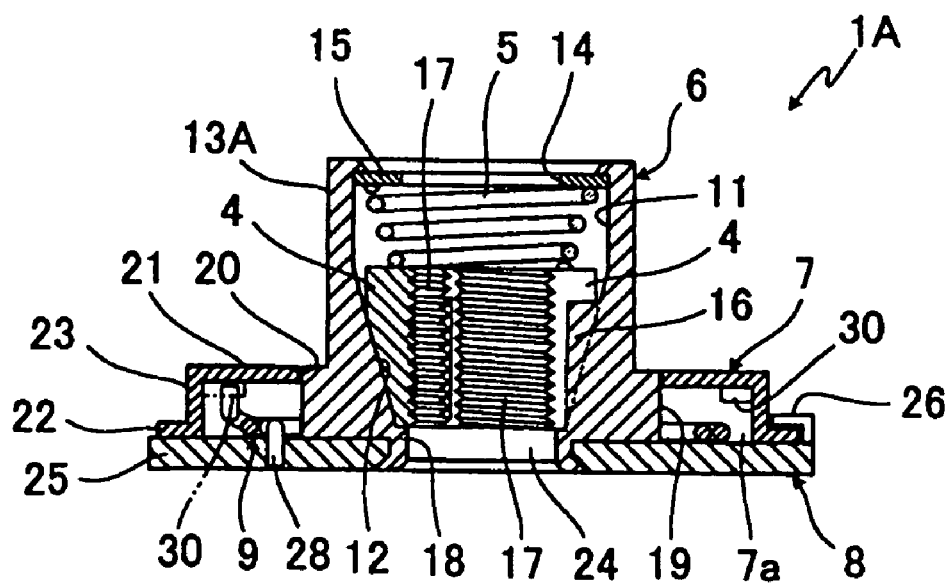
FIG. 14 is a sectional view along the line 14-14 of FIG. 13.
Figure 15:
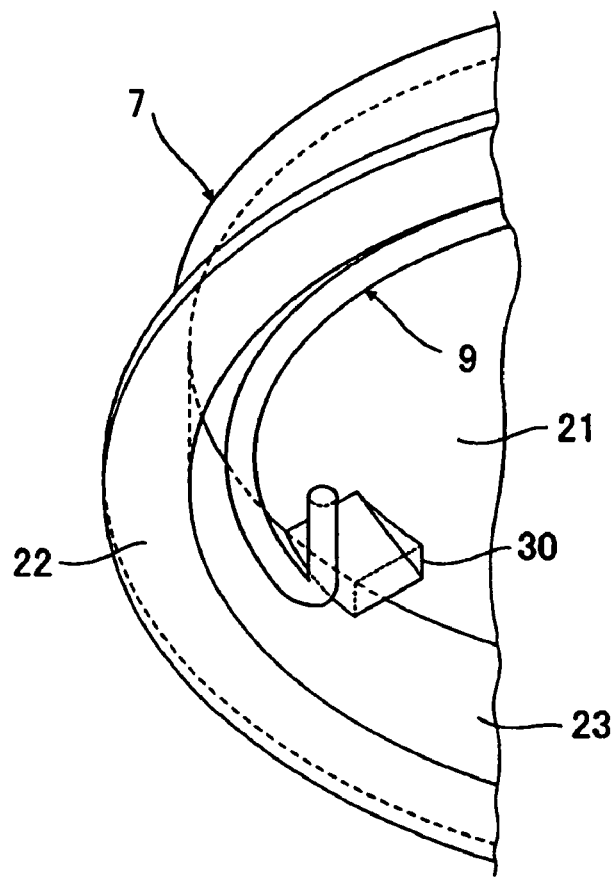
FIG. 15 is an illustration of main section of the second embodiment to practice the present invention.

A second embodiment to practice the present invention is shown in FIGS. 13 to 15. It is distinguished from the first preferred embodiment that: a nut case 13A is used at an inner bottom surface of a top plate 21; the nut case 13A has a plurality, two in this embodiment to practice the present invention for example, of stopper notches 30, 30 in the form of ratchet teeth, being formed at its outer circumferential surface; one end of the nut body urging spring 9 rotates without being stopped by the stopper notches 30, 30 when the nut body 6 is rotated in the tightening direction; it is stopped by the stopper notches 30, 30 when the nut body 6 is reverse-rotated after tight-fixing, providing an urging force to the nut body urging spring 9; and a following slight rotation in the tightening direction will provide an urging force to the nut body 6.

A nut 1A constructed as the above will have similar action effects to that according to the first preferred embodiment to practice the present invention.

Figure 16:
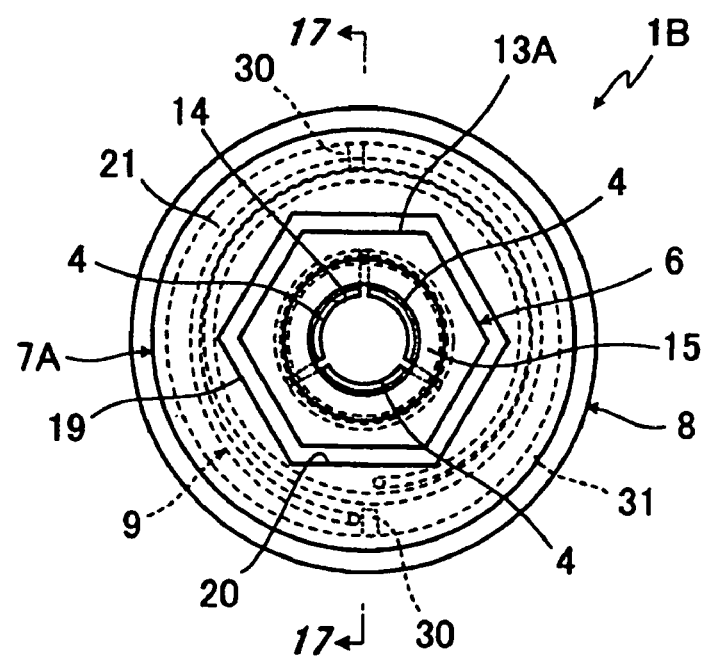
FIG. 16 is a plan view of a third embodiment to practice the present invention.
Figure 17:
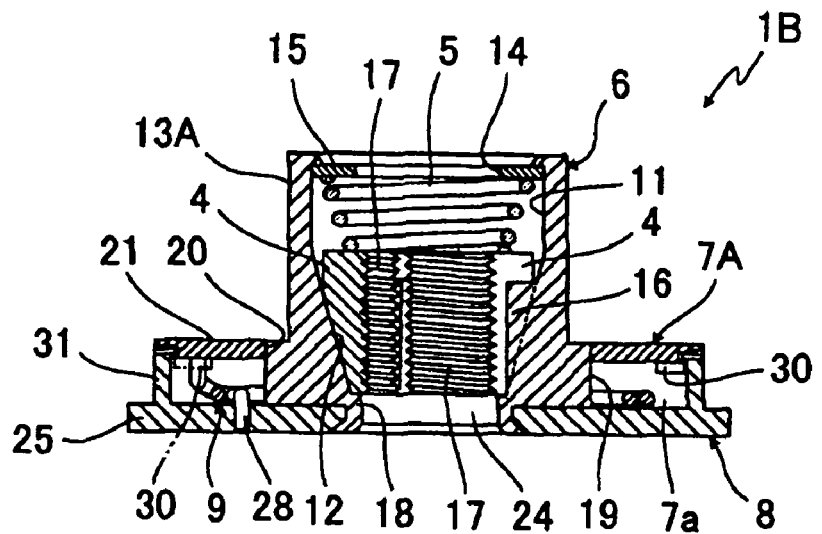
FIG. 17 is a sectional view along the line 17-17 of FIG. 16.
Figure 18:
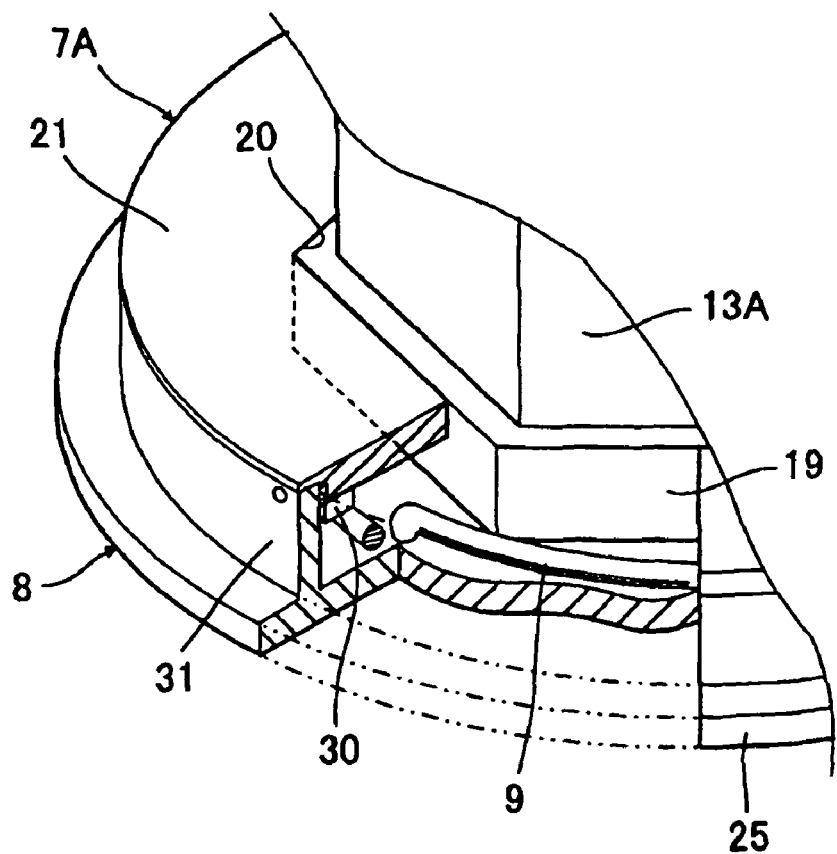
FIG. 18 is an illustration of main section of the third embodiment to practice the present invention.

A third embodiment to practice the present invention is shown in FIGS. 16 to 18. It is distinguished from the second embodiment that: a spring case 7A is used, comprising the top plate 21 under which the stopper notches 30, 30 are formed, and an external wall 31 integrally formed at the outer circumferential surface of the washer 8; and the external wall 31 and the top plate 21 are rotatably attached to each other.

A nut 1B constructed as the above will have similar action effects to that according to the second embodiment to practice the present invention.

Figure 19:
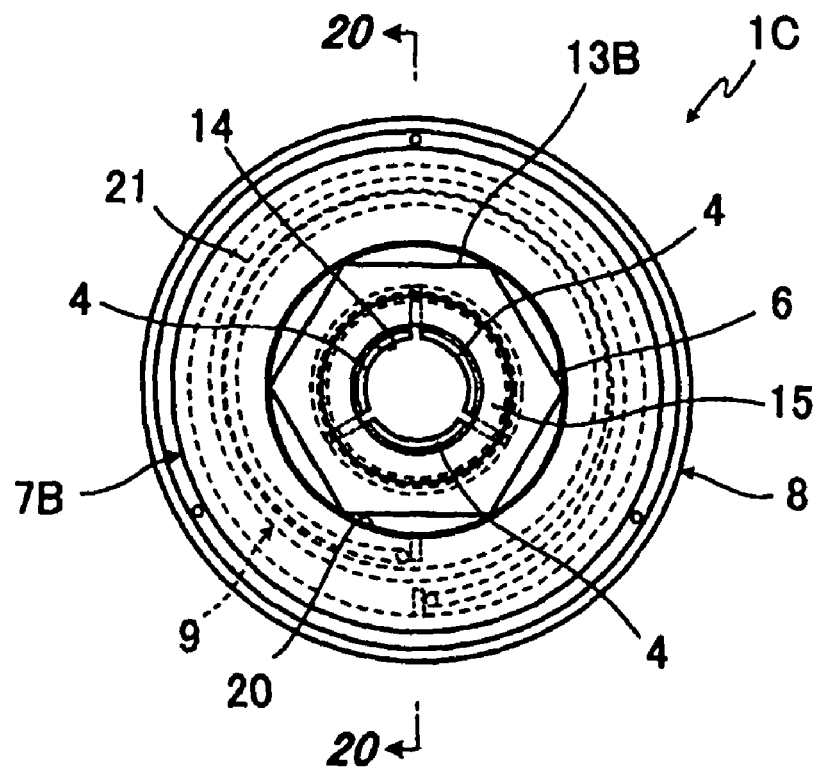
FIG. 19 is a plan view of a fourth embodiment to practice the present invention.
Figure 20:
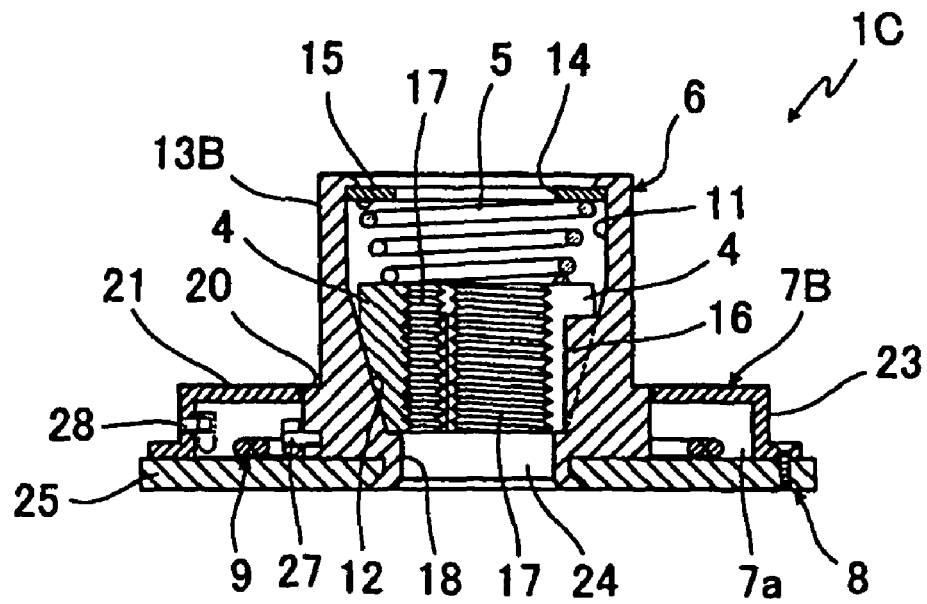
FIG. 20 is a sectional view along the line 20-10 of FIG. 19.
Figure 21:
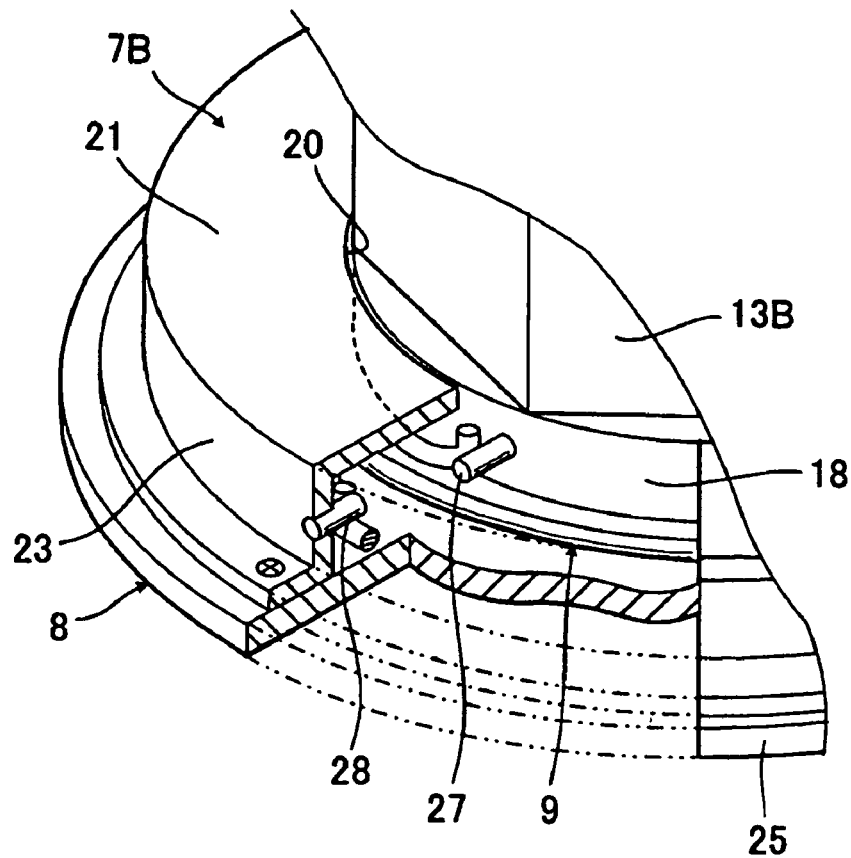
FIG. 21 is an illustration of main section of the fourth embodiment to practice the present invention.

A fourth embodiment to practice the present invention is shown in FIGS. 19 to 21. It is distinguished from the first preferred embodiment that: a spring case 7B is rotatably attached to a lower portion of a nut case 13B; the washer 8 is fixedly attached to the bottom of the spring case 7B; one end of the nut body urging spring is fixed with the pin 27 to the nut segments retainer 18, and the other end is fixed with the pin 28 to the washer 8 or the spring case 7B.

A nut 1C constructed as the above will have similar action effects to that according to the first preferred embodiment to practice the present invention.

Figure 22:
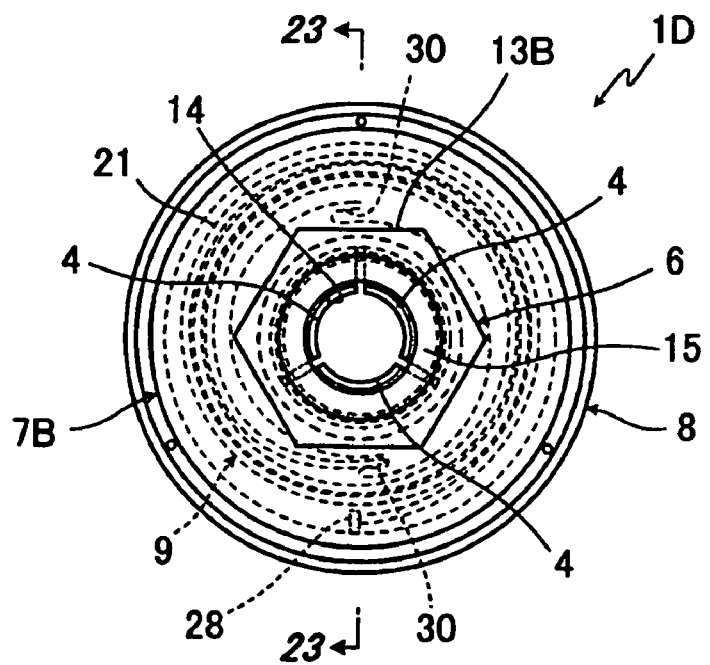
FIG. 22 is a plan view of a fifth embodiment to practice the present invention.
Figure 23:
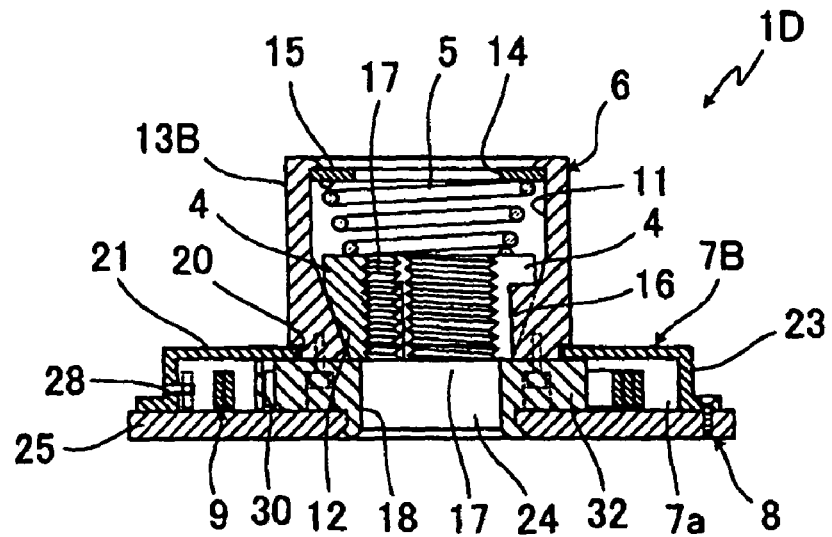
FIG. 23 is a sectional view along the line 23-23 of FIG. 25.
Figure 24:
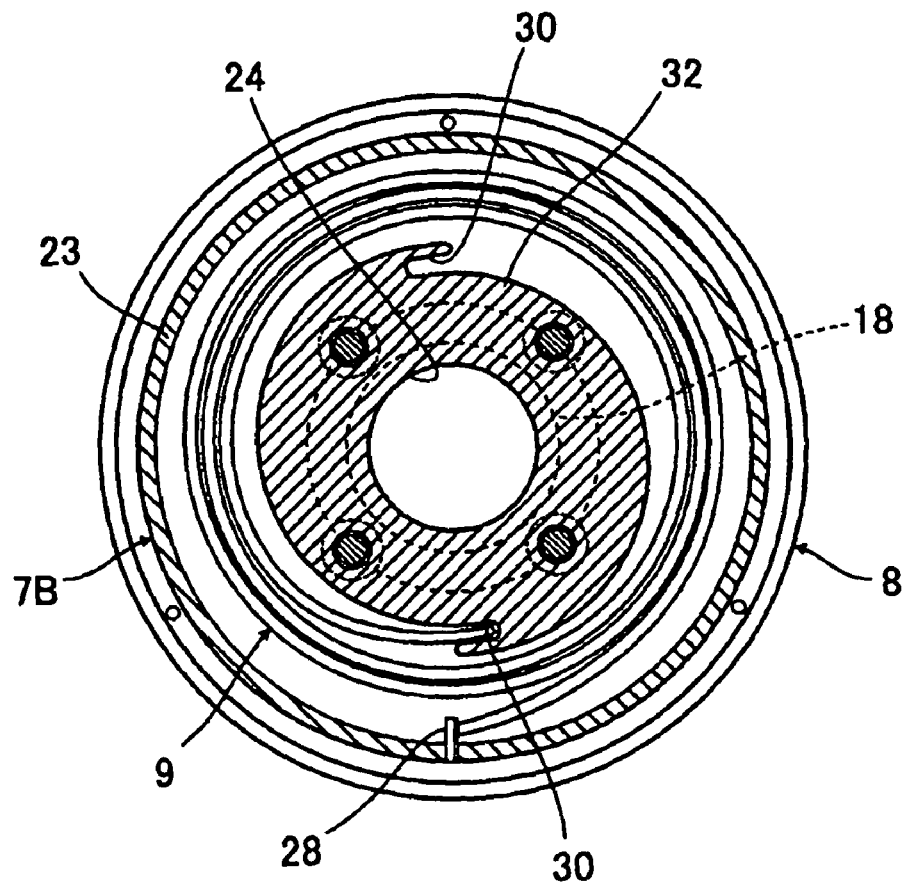
FIG. 24 is an illustration of main section of the fifth embodiment to practice the present invention.

A fifth embodiment to practice the present invention is shown in FIGS. 22 to 24. It is distinguished from the second embodiment that: the spring case 7B is rotatably attached to a lower portion of a nut case 13B; an attachment piece 32, on which the nut segments retainer 18 and the stopper notches 30, 30 are formed, is fixed to the lower end the nut case 13B; one end of the nut body urging spring 9 is stopped by the stopper notches 30, 30 of the attachment piece 32.

A nut 1D constructed as the above will have similar action effects to that according to the second embodiment to practice the present invention.

Figure 25:
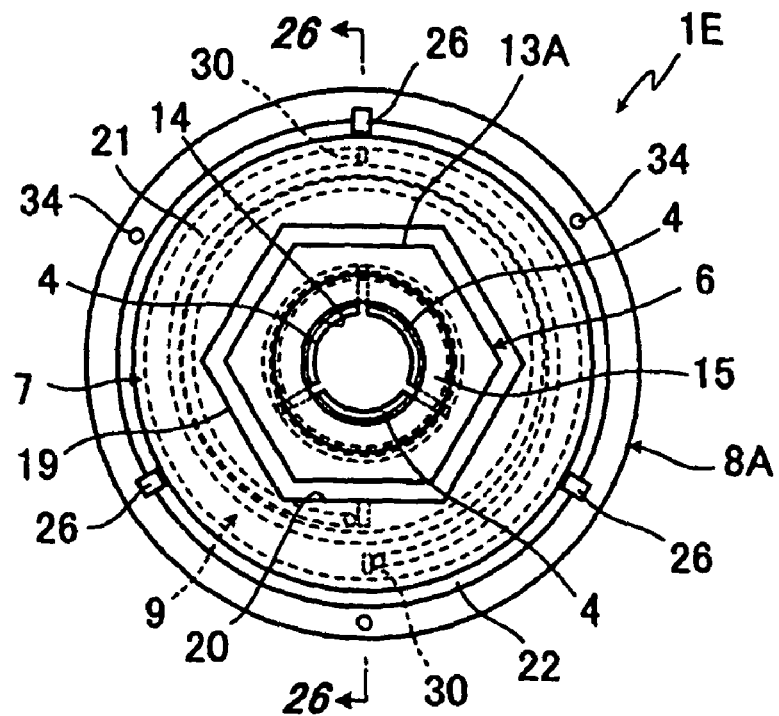
FIG. 25 is a plan view of a sixth embodiment to practice the present invention.
Figure 26:
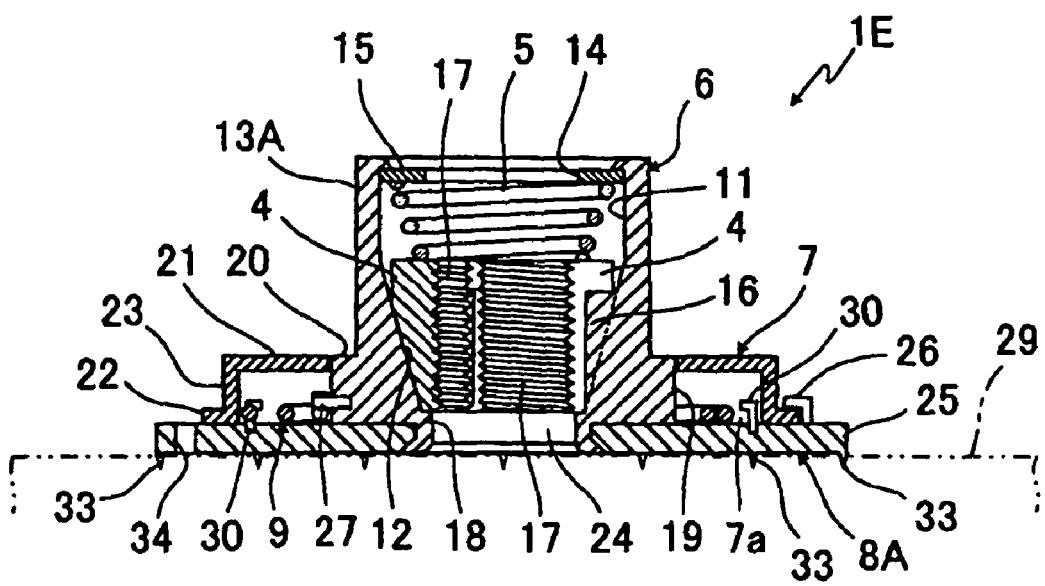
FIG. 26 is a sectional view along the line 26-26 of FIG. 25.
Figure 27:
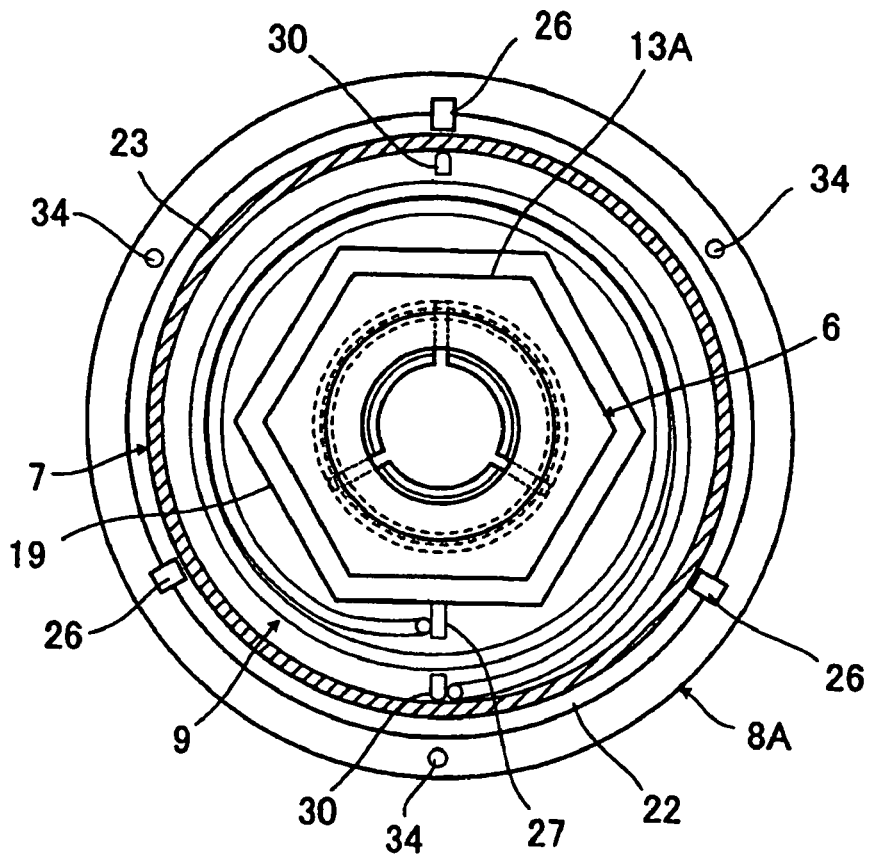
FIG. 27 is an illustration of main section of the sixth embodiment to practice the present invention.

A sixth embodiment to practice the present invention is shown in FIGS. 25 to 27. It is distinguished from the second embodiment that: a washer 8A has at least one or more claws 33 on its bottom, which bite into the timber material 29 when tightened, or screw insertion hole; the washer 8A has the stopper notches 30, 30 thereon; one end of the nut body urging spring 9 is fixed with the stopper pin 27 to the nut case 13A, and the other end is stopped by the stopper notches 30, 30.

A nut 1E constructed as the above will have similar action effects to that according to the second embodiment to practice the present invention.

Figure 28:
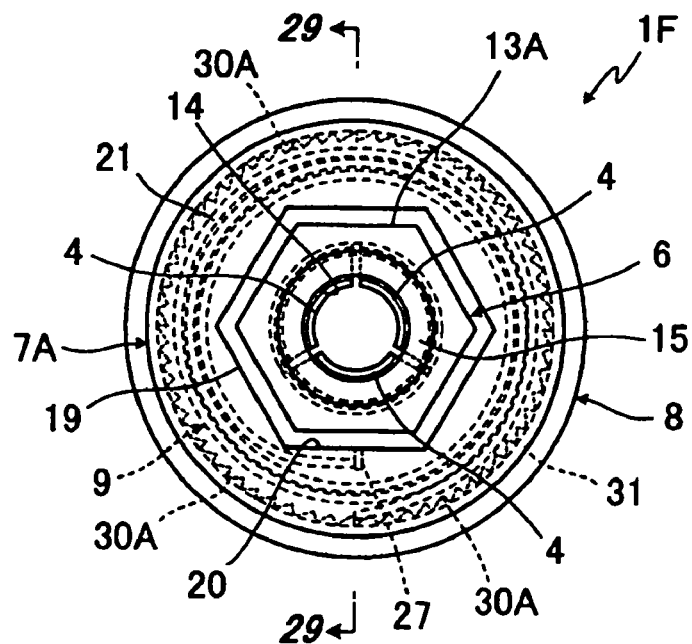
FIG. 28 is a plan view of a seventh embodiment to practice the present invention.
Figure 29:
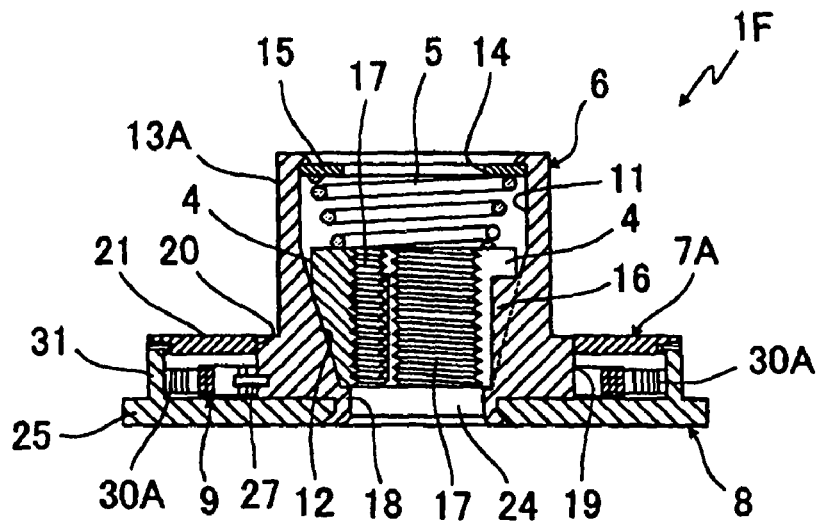
FIG. 29 is a sectional view along the line 29-29 of FIG. 28.
Figure 30:
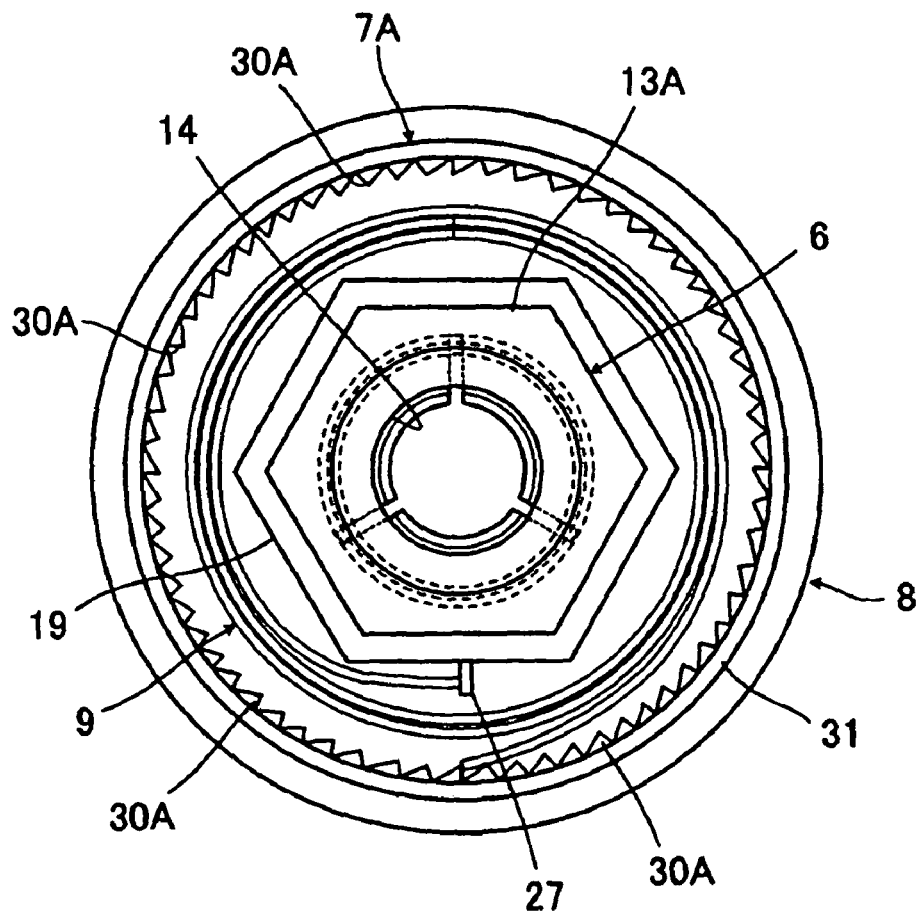
FIG. 30 is an illustration of main section of the seventh embodiment to practice the present invention.

A seventh embodiment to practice the present invention is shown in FIGS. 28 to 30. It is distinguished from the third embodiment that: numerous stopper notches 30A in the form of ratchet teeth are formed on an inner wall surface of the external wall 31 of the spring case 7A; one end of the nut body urging spring 9 is stopped by the stopper pin 27 at the top plate 21 or the nut case 13, and the other end is set to be stopped by the stopper notch 30A.

A nut 1F constructed as the above will have similar action effects to that according to the third embodiment to practice the present invention.

Figure 31:
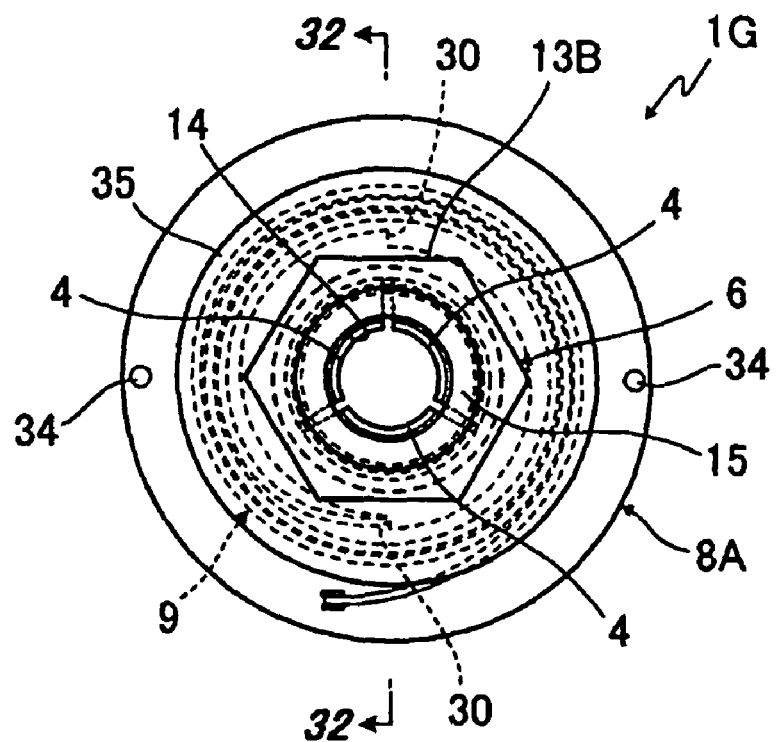
FIG. 31 is a plan view of an eighth embodiment to practice the present invention.
Figure 32:
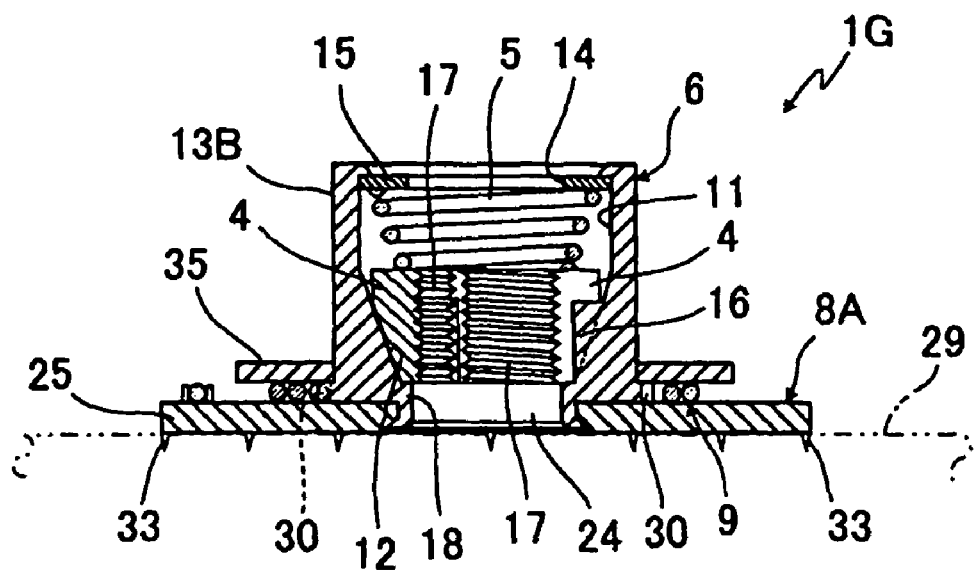
FIG. 32 is a sectional view along the line 32-32 of FIG. 31.
Figure 33:
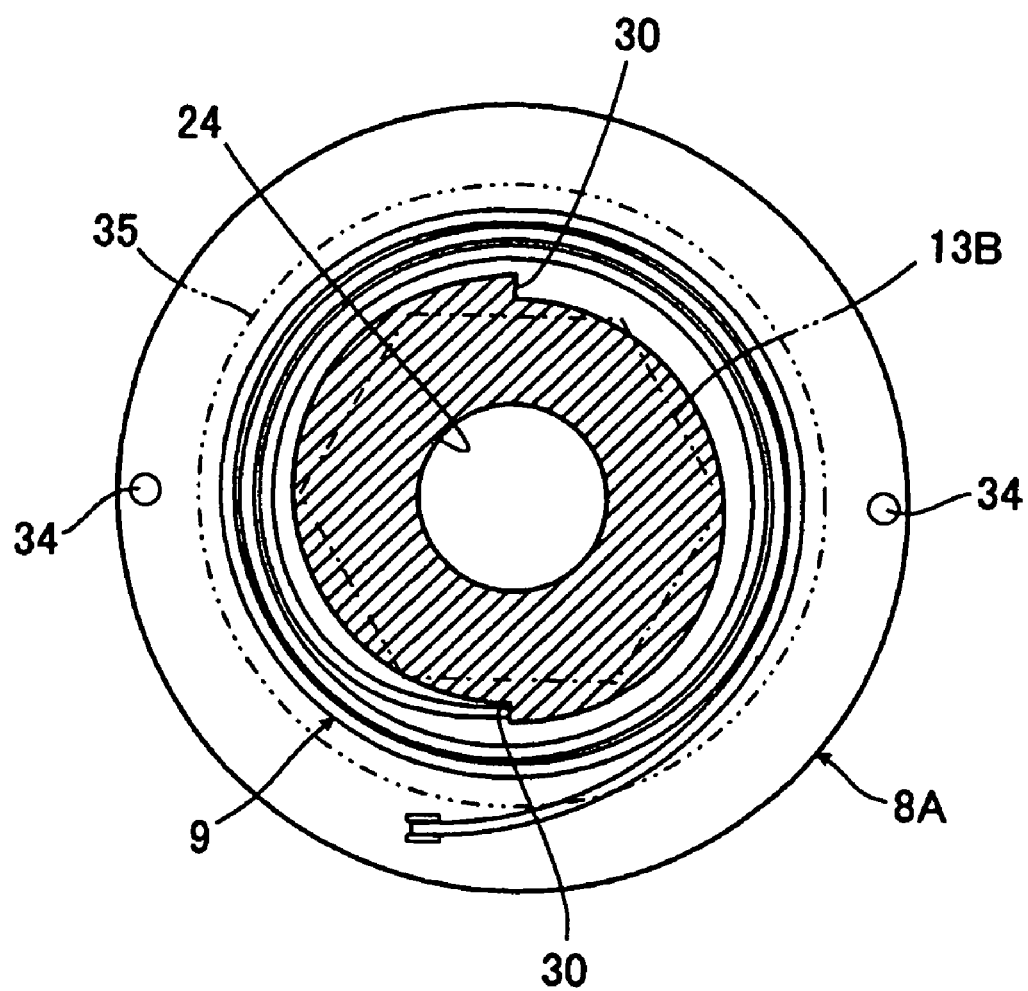
FIG. 33 is an illustration of main section of the eighth embodiment to practice the present invention.

An eighth embodiment to practice the present invention is shown in FIGS. 31 to 33. It is distinguished from the fifth embodiment that: a spring support plate 35, under which bottom a plurality of stopper notches 30 are formed, is fixedly attached to a lower portion of the nut case 13B; the washer 8A, having at least one or more claws 33 thereunder which bite into the timber material 29 when rotated or screw insertion hole 34 therein, is rotatably attached to the bottom end of the nut case 13B; one end of the nut body urging spring 9, placed between the spring support plate 35 and the washer 8A, is stopped by the stopper notch 30 on the spring support plate 35, and the other end is attached to the washer 8A.

A nut 1G constructed as the above will have similar action effects to that according to the fifth embodiment to practice the present invention.

The present invention is applicable in the industry of producing nuts.

What is claimed is:

1. A nut which is comprised of: a nut body which has received in it at least three nut segments and a nut segment urging spring which urges the nut segments, where the nut segments are, when rotated in the tightening direction after a bolt is inserted into the nut segments, screwed on to a threaded portion of the inserted bolt; a spring case which is attached at an upper end thereof to an outer circumferential surface of the nut body other than an upper part of the nut body so that the spring case is rotatable together with the nut body; a washer which is rotatably attached to a lower part of the spring case; a nut body urging spring which is received in the spring case with one end of the spring connected to the spring case or to the nut body and another end thereof to the washer, so that the spring constantly urges the nut body in the tightening direction when the nut body is screwed on to the bolt.

2. A nut which is comprised of: a nut body which has received in it at least three nut segments and a nut segment urging spring which urges the nut segments, where the nut segments are, when rotated in the tightening direction after a bolt is inserted into the nut segments, screwed on a threaded portion of the inserted bolt; a spring case which is rotatably attached at an upper end thereof to a lower part of an outer circumferential surface of the nut body; a washer which is attached to a lower part of the spring case; a nut body urging spring which is received in the spring case with one end of the spring connected to the nut body and another end thereof to the washer or to the spring case, so that the spring constantly urges the nut body in the tightening direction when the nut body is screwed on to the bolt.

3. A nut which is comprised of: a nut body which has received in it at least three nut segments and a nut segment urging spring which urges the nut segments, where the nut segments are, when rotated in the tightening direction after a bolt is inserted into the nut segments, screwed on to a threaded portion of the inserted bolt; a spring support plate which is fixedly attached to an outer circumferential surface of the nut body other than of an upper part of the nut body; a washer which is rotatably attached to a lower part of the nut body with a clearance relative to the spring plate; a nut body urging spring which is received between the washer and the spring plate with one end of the spring connected to the spring plate and another end thereof to the washer, so that the spring constantly urges the nut body in the tightening direction when the nut body is screwed on to the bolt.

* * * * *